United States Patent [19]

van Rosmalen

[11] 4,425,043

[45] Jan. 10, 1984

[54] DEVICE FOR DETECTING THE POSITION OF AN OBJECT

[75] Inventor: Gerard E. van Rosmalen, Eindhoven, Netherlands

[73] Assignee: U.S. Philips Corporation, New York, N.Y.

[21] Appl. No.: 282,626

[22] Filed: Jul. 13, 1981

[30] Foreign Application Priority Data

Apr. 3, 1981 [NL] Netherlands ............................ 810669

[51] Int. Cl.³ .............................................. G01B 11/14
[52] U.S. Cl. .................................... 356/375; 356/152; 356/400; 250/201; 250/578
[58] Field of Search ............... 356/375, 399, 400, 138, 356/150, 152, 153; 250/578, 201

[56] References Cited

U.S. PATENT DOCUMENTS

| 2,703,505 | 3/1955 | Senn | 356/400 |
|---|---|---|---|
| 3,432,671 | 3/1969 | Edmonds | 356/152 |
| 3,532,892 | 10/1970 | Murphy | 356/152 |
| 3,589,815 | 6/1971 | Hosterman | 356/375 |
| 3,966,329 | 6/1976 | Dickey | 356/400 |
| 3,994,588 | 11/1976 | Marx | 356/152 |

Primary Examiner—R. A. Rosenberger
Attorney, Agent, or Firm—Robert J. Kraus

[57] ABSTRACT

A device is described for detecting the position of an object, which device comprises a radiation source, beam-splitting prism, and a detection system comprising a plurality of radiation-sensitive detectors. The object to whose position is to be measured carries only the prism, and each detector is divided into a plurality of subdetectors. The device enables changes in both position and inclination of the object to be measured.

7 Claims, 7 Drawing Figures

DEVICE FOR DETECTING THE POSITION OF AN OBJECT

BACKGROUND OF THE INVENTION

The invention relates to a device for detecting the position of an object, which device comprises a radiation source and a beam-splitting prism for reflecting the radiation emitted by the source to a radiation-sensitive detection system. The system comprises a plurality of detectors, the radiation distribution among the detectors being dependent on the position of the object relative to the radiation beam emitted by the source, and the outputs of the detectors being connected to an electronic circuit for producing an electric signal which provides an indication about the position of the object.

The beam-splitting prism is defined as a prism having two inclined surfaces which define a beam receiving edge of said prism.

U.S. Pat. No. 2,703,505 describes a device for aligning two parts of a machine relative to each other, a beam-splitting prism being arranged on one of said parts. Said prism receives a beam emitted by a radiation source and reflects the radiation to two radiation-sensitive detectors arranged on both sides of the prism. The output signals of the detectors are applied to an electronic circuit in the form of a Wheatstone bridge, whose output signal is a measure of the displacement of the one machine part relative to the other in a direction transverse to the main ray of the beam.

In the known device the radiation-sensitive detectors, in the form of phototubes, and the prism are always arranged on the same machine part. In a first embodiment of this device the radiation source is arranged on the one part and the prism with the detectors on the other part. Electrical wires must be connected, the wires of at least one part being arranged so as to move with said part. This is obviated by a second embodiment in which the radiation source and the prism with the detectors are arranged on the same machine part. However, in that case an additional reflector, which reflects the be beam parallel to itself, is arranged on the second machine part. For detecting the position of a small and light object the use of said reflector, which is relatively heavy and large, may pose a problem.

The known device only permits the measurement of rectilinear movements in two orthogonal directions.

SUMMARY OF THE INVENTION

It is an object of the present invention to provide a device which is of simple construction and which also permits tilt of the object about one or a plurality of axes to be measured. According to the invention the device is characterized in that the object carries only the beam-splitting prism, that each of the detectors is divided into two subdetectors, that the separating lines of the subdetectors of each detector have the same orientation relative to the beam receiving edge of the prism, and that the outputs of the subdetectors are connected to separate inputs of the electronic circuit which supplies one linear position signal and at least one angular position signal.

The term "position of the object" is to be understood to mean both the linear position of the object and the angular linear position of the object. The "position" of the object is measured along one axis of a triaxial coordinate system, whose centre coincides with the reference point relative to which measurement is effected. The "angular position" is the tilt of the object about one of the axes of the coordinate system.

The invention may be employed with great advantage in all those cases where the position of an object or vibrations of an object should be measured, which object should not be excessively loaded, which object is not readily accessable or which object is located in a medium that should not be disturbed. The invention also enables measurements of the positions of objects which are disposed at a comparatively large distance from the observer. The device in accordance with the invention is especially suitable for measurements of the positions of objects which are completely or partly freely floating, that is, objects with several degrees of freedom.

A first embodiment of a device in accordance with the invention is characterized in that the separating lines of the sub-detectors are disposed transversely of the beam receiving edge of the prism, that the position signal provides an indication about the position of the object in a direction transverse to the refracting edge of the prism, and that the angular-position signal is a measure of the tilt angle of the object about an axis transvers to the edge and parallel to the main ray of the beam, or about an axis transverse to the edge and transverse to the main ray of the beam. This device permits tilt of the object about two axes to be measured simultaneously.

A second embodiment of the device in accordance with the invention is characterized in that the separating lines of the subdetectors are disposed parallel to the beam receiving edge of the prism, that the position signal represents the position of the object in the direction of the main ray of the beam, and that the angular-position signal is a measure of the tilt angle of the object about an axis parallel to the edge of the prism.

An embodiment of the device in accordance with the invention by means of which the position of the object in two orthogonal directions and tilt of the object about three orthogonal axes can be determined is characterized in that each of the detectors comprises four subdetectors arranged in quadrants, the two orthogonal separating lines in the one detector having the same orientation as the corresponding separating lines in the other detector, and that the electronic circuit comprises five outputs.

In order to prevent a tilt position or a displacement of the object from influencing a position signal and an angular position signal respectively, a preferred embodiment of the device in accordance with the invention is characterized in that the main ray of the beam is directed at the nominal position of the midpoint of the prism edge in a direction parallel to the beam receiving edge.

Especially, in the case of heavy and/or rapidly moving objects whose linear position and angular position should be adjusted accurately a large lock-in range of the detection device is required. A large lock-in range is obtained by means of an embodiment of the device in accordance with the invention, which is further characterized in that the apex angle of the prism is substantially greater than 90°.

In recent years there has been much progress in the field of optical record carriers. The information in such record carriers is optically recorded and read. Such record carriers are suitable for the storage of a video program, of an audio program, but also of digital data, for example from and to a computer. In an apparatus for recording and/or reading an optical record carrier a radiation beam is focused by means of an objective system to form a very small radiation spot on the surface of the information structure Especially in the case of digital data the radiation spot is to be moved rapidly over the record carrier in order to enable random areas to be inscribed and/or read. For this purpose use can be made of a coarse control and a fine control. The fine control may comprise the displacement or tilting of the objective system relative to the other elements of the optical system. For measuring the position of the objective system it is advantageous to utilize the device in accordance with the invention. An apparatus for inscribing and/or reading an optical record carrier provided with a position-detection device in accordance with the invention is characterized in that the prism of the position-detection device is arranged on the objective system and that the outputs of the electronic circuit of the position-detection device are connected to control circuits which control electromagnetic actuating means for the objective system.

BRIEF DESCRIPTION OF THE DRAWING

The invention will now be described in more detail with reference to the drawing. In the drawing.

DESCRIPTION OF THE PREFERRED EMBODIMENTS

Figure 1:
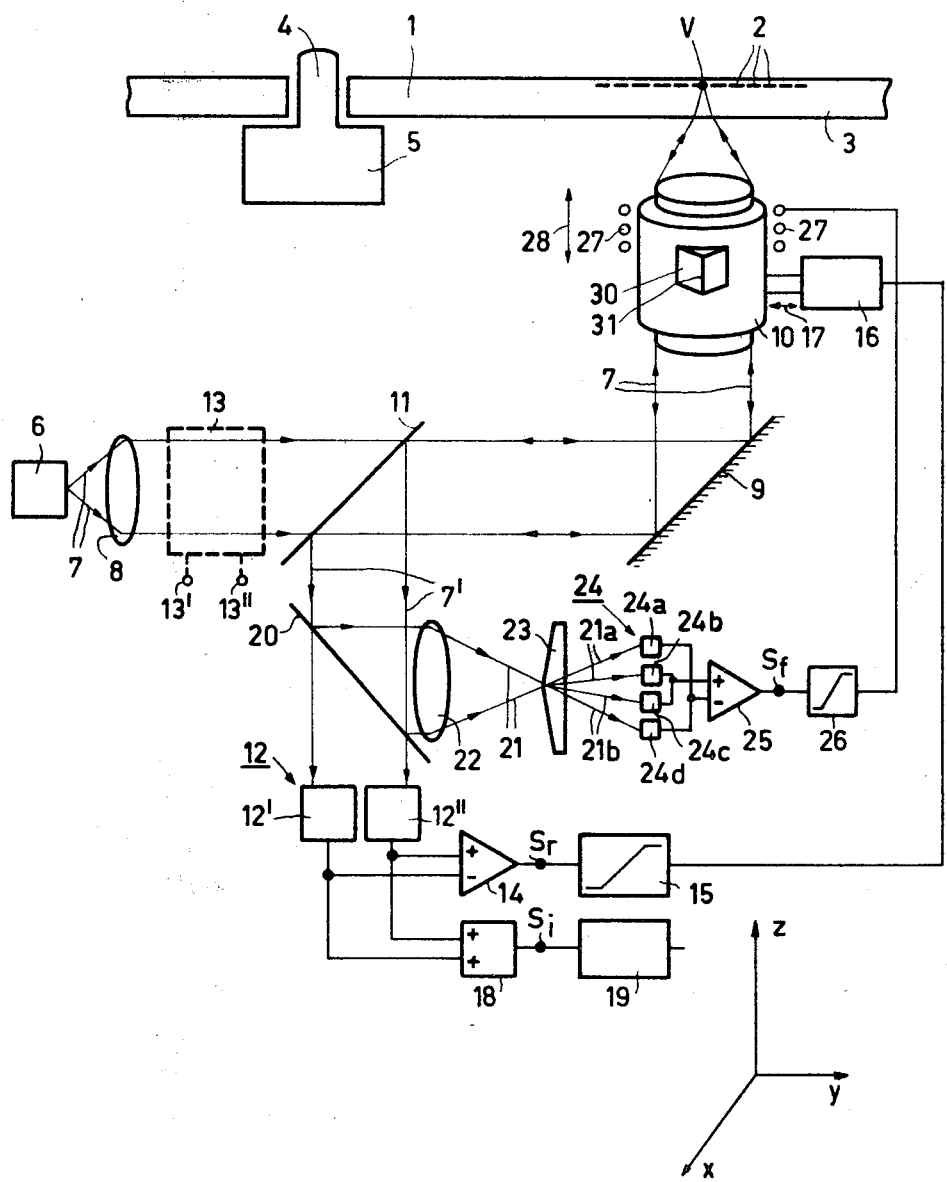
FIG. 1 shows a write-read apparatus in which the objective system is provided with a position-detection prism.

FIG. 1 schematically shows an apparatus for inscribing and/or reading a record carrier 1. The round disk-shaped record carrier is shown in radial cross-section, so that the information tracks 2 extend perpendicularly to the plane of drawing, i.e. in the X direction. The radiation beam 7 produced by a radiation source 6, for example a gas laser or a semiconductor-diode laser, is reflected to the record carrier by a mirror 9, the beam being focused by an objective system 10 to form a radiation spot V of minimal dimensions in the plane of the information tracks 2. The tracks form a reflecting information structure is located on the upper side of the record carrier, so that the substrate 3 functions as a protective layer.

When reading an inscribed record carrier use is made of the beam 7' which is reflected by the information structure. This beam traverses the objective system, is reflected by the mirror 9 and is subsequently separated from the beam 7 emitted by the source, for example with the aid of a semi-transparent mirror 11, which reflects the beam 7' to a radiation-sensitive detection system 12. As the record carrier is rotated by a spindle 4 which is driven by a motor 5, the intensity of the beam 7' will vary with a high frequency, in accordance with the information stored in an information track.

When information is recorded the intensity of the beam 7 is modulated in accordance with the information to be recorded. For this purpose a modulator 13, for example an electro-optical or an acousto-optical modulator, may be arranged in the radiation path, the signal to be recorded being applied to the input terminals 13', 13" of said modulator. If the radiation source is a diode laser said laser can be modulated directly and no separate modulator 13 is needed.

For reading the information the detection system 12 may comprise one radiation-sensitive detector, which converts the intensity modulation of the beam 7' into an electric signal. A write/read apparatus requires a servo-system in order to correct the position of the radiation spot relative to a track. A deviation of the position of the centre of the radiation spot relative to the track may for example be detected in the manner as shown in FIG. 1. There the detection system 12 comprises two detectors 12' and 12", which are arranged adjacent each other in the Y-direction, that is in the direction transverse to the track direction. The output signals of these detectors are applied to the inputs of a differential amplifier 14, on whose output a positional error signal $S_r$ is available. This signal is applied to a controller 15, which controls an actuator 16 by means of which the objective system can be moved in the direction of the error 17. If the radiation spot V has shifted to the left or to the right relative to the track centre, one of the detectors 12" or 12' will receive a higher radiation intensity than the other, so that the signal $S_r$ increases and decreases respectively. Consequently, the objective system is moved to the right or to the left respectively.

By adding the signals from the detectors 12' and 12" in the summing device 18 a signal $S_i$ is obtained, which represents the information being read. This signal is applied to an electronic processing circuit 19, in which it is rendered suitable for reproduction by means of conventional equipment, such as a television set or audio equipment.

When recording or reading is effected by means of a small radiation spot it is necessary to constantly check that the radiation beam 7 is sharply focused in the plane of the information structure. FIG. 1 shows an example of a focusing-error detection system. By means of a semi-transparent mirror 20 a part of the reflected beam 7' is routed to a second radiation-sensitive detection system 24. By means of a lens 22 the beam 21 is focused at a wedge 23. The wedge splits the beam into two beams 21a and 21b, the intensity distribution within each of said beams being determined by the degree of focusing of the beam 7 on the information structure. The detection system 24 comprises four detectors 24a, 24b, 24c and 24d. The signals from the detectors 24a and 24d are together applied to a first input of a differential amplifier 25 and the signals from the detectors 24b and 24c to a second input of the amplifier. The focusing-error signal $S_f$ supplied by the differential amplifier 25 is applied to a controller 26. In order to enable the objective system to be moved in the direction of the arrow 28 said system may be equipped with electromagnetic actuating means, which in FIG. 1 are schematically represented by the coil 27. The controller 26 then controls the current through said coil. If the beam 7 is focused exactly in the plane of the information structure the beam 21 is focused exactly at the top of the wedge 23 and the intensity distribution of the respective beams 21a and 21b is then symmetrical relative to the detectors 24a, 24b and the detectors 24c, 24d respectively, the signal $S_f$ being zero. When the focus of the beam 7 moves, the intensity distribution within the beams 21a and 21b relative to the detectors will vary. The signal $S_f$ then becomes unequal to zero and the current through the coil 27 of the objective system changes.

With the servosystem described (12', 12", 14, 15, 16) the position of the radiation spot in the radial direction, that is in the Y-direction, can be controlled very accurately. This system is intended for fine control and has a small range. In practice this system is combined with a second servosystem, which enables coarse control of the radial position of the radiation spot. The second servosystem may comprise a system for controlling the position, in the Y-direction, of a carriage on which all the elements of the radiation path are arranged. It is alternatively possible that those elements to which the electrical wires should be connected, such as the radiation source and the detectors, are not arranged on a carriage for coarse control. Such a carriage would, for example, carry only the objective system and the mirror 9.

In a write/read apparatus in which the objective system can move relative to the other elements, it is desirable to detect the position of the objective system in the Y-direction. During writing and reading it is then possible to ascertain whether the fine control system is approaching the end of its control range, which covers for example only a few tracks, so that a signal which renders the coarse control system operative can be applied to said system. Furthermore, when the apparatus is started and the record carrier does not yet produce a signal $S_r$, it is desirable to measure the position of the objective system, so that said system can be set to its centre position. finally, a displacement of the objective system out of its centre position will result in a shift of the main ray of the read beam 7' relative to the detectors 12' and 12", which shift is independent of the position of the radiation spot V relative to the track centre. As a result of this, the radiation spot may then be controlled in such a way that the centre of the radiation spot no longer coincides with the track centre. In order to eliminate the influence of the position of the objective system on the signal $S_r$ it is also desirable to detect the position of said system.

An objective system may also exhibit tilting about the X-axis. In order to eliminate such a tilted position it should also be measured.

In Netherland patent application no. 77.03232 (PHN.8739), corresponding to U.S. Pat. No. 4,135,206, a write-read apparatus is proposed in which fine control of the radiation spot V in the Y-direction is achieved by slightly tilting the objective system about the X-axis. This tilted position should also be measured for the same three reasons as mentioned for the fine control of the radiation spot by means of a displacement of the objective system.

Figure 2:
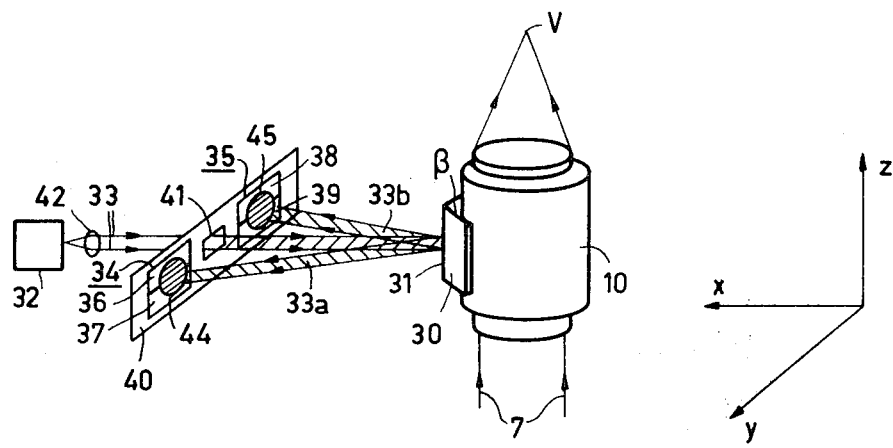
FIG. 2 shows the position-detection device employed in said apparatus.

For the simultaneous measurement of the tilt and the displacement of the objective system, a prism 30 is arranged, in accordance with the invention, on the objective system or on a holder for the system. Said prism forms part of a position-detection system which is shown in FIG. 2. The objective system 10 in FIG. 2 is rotated through 90° relative to the system in FIG. 1. The position-detection system comprises an auxiliary radiation source 32, for example a diode laser, which emits a radiation beam 33, which beam is incident on the prism 30. If the beam is incident on the refracting edge 31 of the prism, two subbeams 33a and 33b are formed, which are reflected to the detectors 34 and 35. Each of said detectors is divided into two subdetectors 36, 37 and 38, 39 respectively, the separating lines of the subdetectors being disposed transversely of the refracting edge 31 of the prism 30. The detectors may be arranged on a common support 40, in which an aperture 41 is formed for the beam 33. If desired, a lens 42 may be provided, which transforms the diverging beam from the source into a parallel beam or a converging beam. In the lastmentioned case the radiation spot on the prism can be smaller, so that the sensitivity of the detection device increases. Suitably, the radiation source is arranged on the support 40 at the location of the aperture 41.

Care has been taken that when the objective system occupies its centre position, along the Y-axis, the centre of the radiation beam 33 is exactly incident on the refracting edge of the prism. The radiation spots 44 and 45 formed on the detectors 34 and 35 by the reflected beams 33a and 33b then have the same radiation energy. If the objective system is off-centre, the beam 33 will be asymmetrically incident on the prism and more radiation energy will be reflected via one of the beams 33a and 33b than via the other beam. If the signals from the detectors 36, 37, 38 and 39 are designated $S_{36}$, $S_{37}$, $S_{38}$ and $S_{39}$, the signal $S_y$ which represents the position of the objective system in the Y-direction will be:

$$S_y=(S_{36}+S_{37})-(S_{38}+S_{39}).$$

If the detectors are correctly aligned relative to the radiation source 32, the radiation spot 44 or 45, if the refracting edge 31 of the prism 30 is parallel to the Z axis, will be disposed symmetrically relative to the respective detectors 36, 37 or the detectors 38 and 39. If the objective system, and thus the prism 30, is now tilted about the X axis, one of the radiation spots 44 and 45, will move upward and the other downward. It will be appreciated that a signal $S_{xr}$ which is proportional to the tilting angle of the objective system about the X-axis may be represented by:

$$S_{xr}=(S_{37}+S_{38})-(S_{36}+S_{39}).$$

Figure 3:
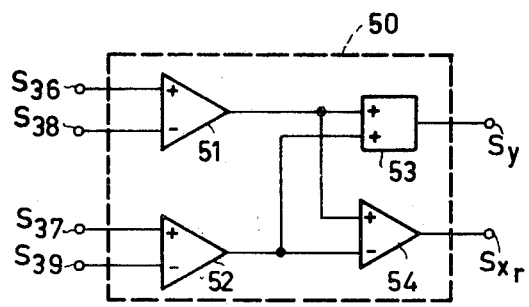
FIGS. 3 and 4 show examples of an electronic circuit for processing the signals supplied by the detectors of the position-detection system.

FIG. 3 shows an embodiment of an electronic circuit 50 in which the detector signals are processed to the signals $S_y$ and $S_{xr}$. The signals from the detectors 36 and 38 are applied to a first differential amplifier 51 and those from the detectors 37 and 39 to a second differential amplifier 52. The outputs of the differential amplifiers are connected both to the inputs of a third differential amplifer 54 and to the inputs of a summing device 53. On the output of the summing device 53 the position signal $S_y$ is obtained and on the output of the differential amplifier 54 the tilting signal $S_{xr}$. These signals are used for correcting the objective system.

As an example, the signal $S_y$ may be applied to the controller 26 of FIG. 1. The signal $S_{xr}$ may be applied to the electromagnetic means associated with the objective system, which means are capable of tilting said system about the X-axis. The means by which the objective system can be moved in the direction of the Y-axis and can be tilted about the X-axis fall beyond the scope of the present invention. Said means may for example be constructed as described in Netherlands patent application no. 7703232; (PHN.8739), corresponding to U.S. Pat. No. 4,135,206 or Netherlands patent application no. 8004380 (PHN.9806), corresponding to U.S. Pat. No. 4,394,755 which are incorporated herein by reference.

Both translation and tilt position of the objective can be measured simultaneously by simple means, such as a small prism on the objective, which prism hardly influences the movement of said objective, a simple radiation source, in the form of, for example, a light-emitting diode (LED) or a diode laser, two detectors which are divided into two sections, and a simple electronic circuit.

The arrangement in accordance with FIG. 2 also enables a second tilt angle to be measured, namely that about the Y-axis. Such a tilt position results in the radiation spots 44 and 45 both being moved upward or downward. The signal $S_{yr}$, which is proportional to said tilt angle is given by:

$$S_{yr}=(S_{36}+S_{38})-(S_{37}+S_{39}).$$

Figure 4:
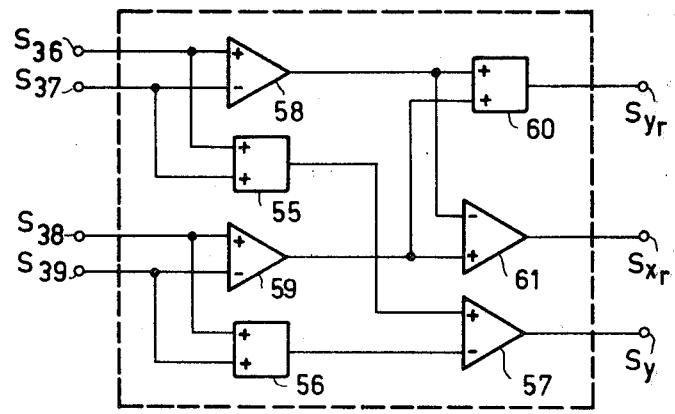

FIG. 4 shows an example of an electronic circuit in which the signals $S_{36}$, $S_{37}$, $S_{38}$ and $S_{39}$ are processed to the signals $S_y$, $S_{xr}$ and $S_{yr}$. The operation of this circuit is obvious to those skilled in the art and is therefore not discussed in more detail.

Figure 5:
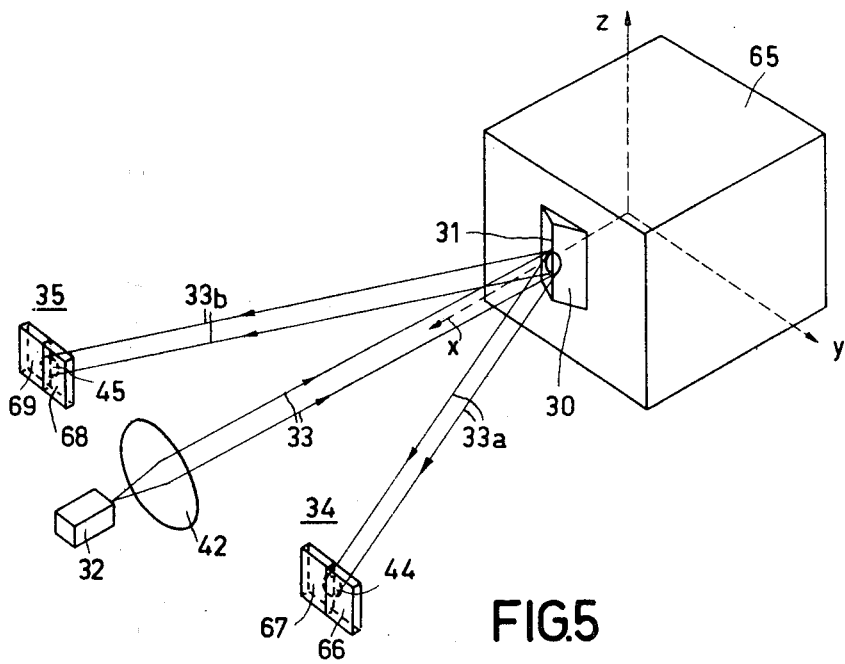
FIGS. 5 and 6 show two embodiments of the position-detection device.

FIG. 5 shows a position-detection system by means of which the position along the X-axis, that is the direction of the radiation beam 33, and the tilt angle relative to the Z-axis of an arbitrary object 65 can be measured. The separating lines of the subdetectors 66, 67, 68 and 69 are now parallel to the refracting edge 31. If the object moves in the positive X-direction, that is towards the reader in FIG. 5, the radiation spots 44 and 45 will both move inwards and the detectors 67 and 68 will receive more radiation than the detectors 66 and 69. The signal $S_x$, which represents the position along the X-axis, is:

$$S_x=(S_{66}+S_{69})-(S_{67}+S_{68}).$$

If the object is tilted about the Z-axis, the radiation spots 44 and 45 both move in the same Y-direction. The signal $S_{zr}$, which is a measure of this tilting angle, is represented by:

$$S_{zr}=(S_{66}+S_{68})-(S_{67}+S_{69}).$$

In order to derive the signals $S_x$ and $S_{zr}$ from the detector signals a circuit arrangement in accordance with FIG. 3 may be used, the terminals to which the signals $S_{36}$, $S_{38}$, $S_{37}$ and $S_{39}$ were applied now respectively receiving the signals $S_{66}$, $S_{67}$, $S_{68}$ and $S_{69}$. The signals $S_{zr}$ and $S_x$ are then obtained on the output terminals of the summing device 53 and the differential amplifier 54 respectively.

A great advantage of the position-detection device described is that the object which has its position measured is lightly loaded and need not be connected to the measuring arrangement via wires. For the measurement it suffices that a small prism is attached to the object; the other elements of the detection system are stationary. The object may also be located at a comparatively large distance from the source and the detectors, provided that a sufficiently large portion of the radiation beam 33 is incident on the prism. The position-detection device may for example be used with great advantage in displacement or inclination measurements or vibration tests to which objects or models which float on a fluid or which are located in a wind tunnel are subjected.

Figure 6:
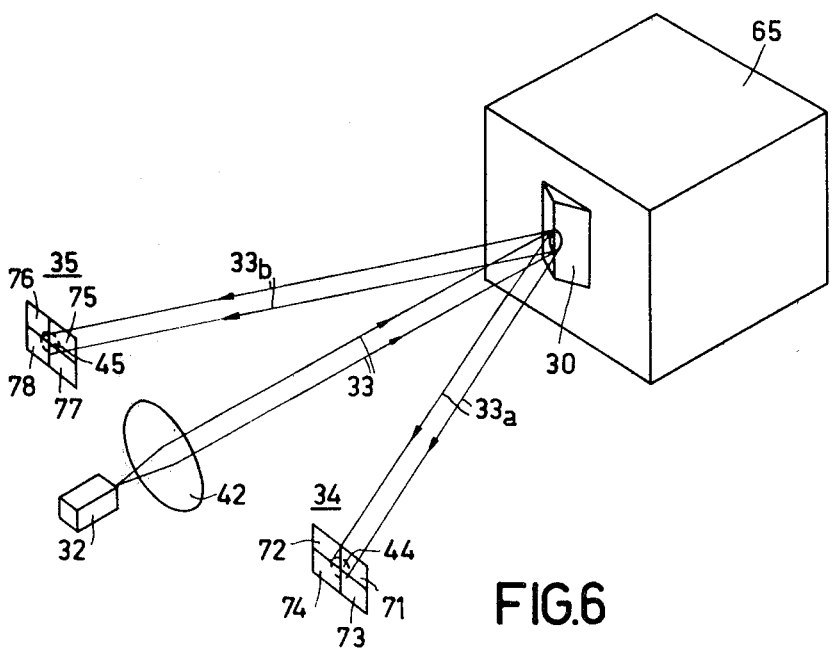

The principal advantage of the position detection system is that by means of a simple arrangement it is, in principle, possible to simultaneously measure vibrations or displacements along two orthogonal axes and tilting about three axes of an object. An arrangement suitable for this purpose is shown in FIG. 6. This arrangement differs from that in accordance with FIG. 5 in that each of the detectors is now divided into four subdetectors 71, 72, 73, 74 and 75, 76, 77 and 78 respectively. After the foregoing it will be evident that the position signals $S_y$ and $S_x$ and the tilting signals $S_{xr}$, $S_{yr}$ and $S_{zr}$ may be represented by:

$$S_y=(S_{71}+S_{72}+S_{73}+S_{74})-(S_{75}+S_{76}+S_{77}+S_{78})$$

$$S_x=(S_{71}+S_{73}+S_{76}+S_{78})-(S_{72}+S_{74}+S_{75}+S_{77})$$

$$S_{xr}=(S_{71}+S_{72}+S_{77}+S_{78})-(S_{73}+S_{74}+S_{75}+S_{76})$$

$$S_{yr}=(S_{71}+S_{72}+S_{75}+S_{76})-(S_{73}+S_{74}+S_{77}+S_{78})$$

$$S_{zr}=(S_{71}+S_{73}+S_{75}+S_{77})-(S_{72}+S_{74}+S_{76}+S_{78})$$

Figure 7:
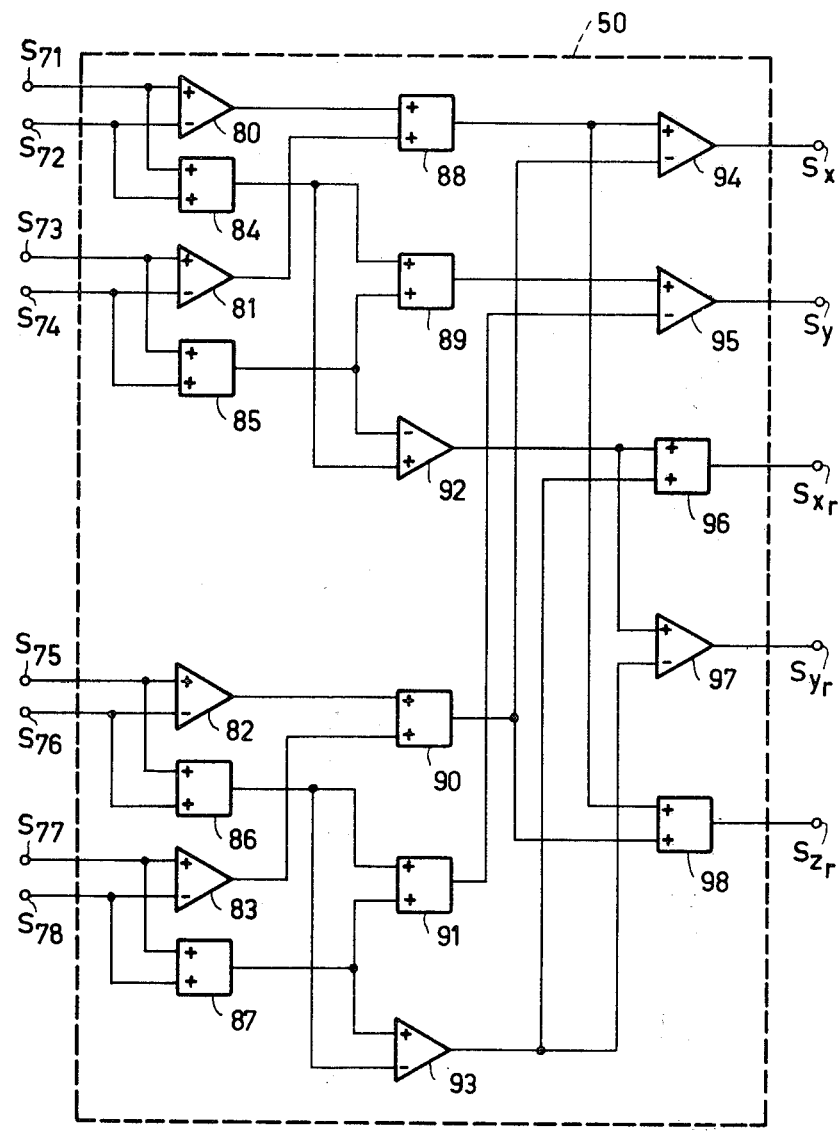
FIG. 7 shows an example of an electronic circuit for processing the signals supplied by the detectors of the position-detection device.

FIG. 7 shows an example of an electronic circuit for processing the detector signals into the signals $S_x$, $S_y$, $S_{xr}$, $S_{yr}$, $S_{zr}$. The operation of this circuit, which comprises a large number of subtractors and adders bearing separate reference numerals, is evident from the Figure and requires no further explanation.

The separating lines of the subdetectors need not be disposed transversely of and parallel to the refracting edge of the prism, but may alternatively be disposed at an angle of 45° to said edge. In the case of small displacements or tilting angles of the object, the radiation energy in the centre of the detectors will not change. In those cases the centres of the two detectors may be radiation-insensitive, so that the sensitivity of the detection device increases. The detectors may also be circular instead of rectangular and then for example comprise a radiation-sensitive ring, divided into segments, surrounding a radiation-insensitive centre portion.

The detector signals in the detection devices in accordance with FIGS. 2, 5 and 6 are independent of displacements of the object in the Z-direction. However, a displacement in said direction may lead to increased cross-talk between position signals and tilting signals. Therefore, the detection system is suitably arranged in such a way relative to the object that the main ray of the beam 33 is directed towards the nominal position of the midpoint of the prism edge in the Z-direction.

In principle, the apex angle $\alpha$ of the prism 30 may be 90°. If the detection device is employed for positioning objects which are comparatively heavy and/or which move with a comparatively high speed, it is desirable to have an early indication that the object is approaching the desired position, so that it can be braked in due time and the desired position is approached with a sufficiently reduced speed. In that case a large lock-in range is required. Such a large lock-in range can be obtained by the use of a prism having a large apex angle. For such a prism, or wedge, a displacement of the prism relative to the incident radiation beam 33 results in a substantially smaller shift of the reflected subbeams 33a and 33b over the detectors 34 and 35, so that even in the case of larger displacements of the prism relative to the incident radiation beam the detectors receive sufficient radiation. As is described in Netherlands patent application no. 8101668 (PHN.9996), corresponding to U.S. patent application 363,677, filed March 30, 1982 and which is incorporated herein by reference, the lock-in range may be extended by a factor $\frac{1}{2}\alpha^2$, where $\alpha$ is the base angle of the prism expressed in radians, under certain circumstances by increasing the apex angle, for example up to 167°, and correspondingly reducing the base angle of the prism, for example to 6.5°.

What is claimed is:

1. An apparatus for measuring the position of an object relative to a coordinate system, comprising:
   a. a beam-splitting device mounted on the object and including a beam receiving edge defined by two inclined surfaces, said device being adapted for splitting a beam of radiation incident to said edge into first and second beams directed away from said object;
   b. a radiation source, remote from the object, for directing a beam of radiation toward the edge of the beam splitting device;
   c. first and second radiation sensitive detectors, remote from the object, for receiving the first and second beams and producing electrical signals representing the intensities of said beams, said detectors each including at least two subdetectors separated by a line having a predefined orientation relative to the edge; and
   d. circuitry coupled to the detectors for summing said signals and producing position signals representing a linear position and an angular position of the object relative to the coordinate system.

2. An apparatus as in claim 1, characterized in that the lines separating the subdetectors are disposed transversely with respect to the edge, the linear position signal represents the position of the object along a line transverse to the edge, and the angular position signal represents the tilt of the object about an axis transverse to the edge and parallel to the beam produced by the radiation source.

3. An apparatus as in claim 1, characterized in that the lines separating the subdetectors are disposed transversely with respect to the edge, the linear position signal represents the position of the object along a line transverse to the edge, and the angular position signal represents the tilt of the object about an axis transverse to the edge and transverse to the beam produced by the radiation source.

4. An apparatus as in claim 1, characterized in that the lines separating the subdetectors are disposed parallel to the edge, the linear position signal represents the position of the object along a line parallel to the beam produced by the radiation source, and the angular position signal represents the tilt of the object about an axis parallel to the edge.

5. An apparatus as in claim 1, characterized in that the detectors each comprise four subdetectors arranged in quadrants defined by two orthogonal separating lines having predefined orientations relative to the edge, and the circuitry is adapted for summing the signals produced by the detectors and producing two linear position signals representing the position of the object along two orthogonal lines, both transverse to the edge, and three angular position signals representing the tilt of the object about three orthogonal axes.

6. An apparatus as in claim 1, 2, 3, 4 or 5, characterized in that the radiation source is aimed such that the beam produced thereby is directed at a nominal position for the midpoint of the edge.

7. An apparatus for controlling the position of an objective relative to a track-bearing optical information structure, said apparatus comprising:
   a. a beam-splitting device mounted on the objective and including a beam receiving edge defined by two inclined surfaces, said device being adapted for splitting a beam of radiation incident on said edge into first and second beams directed away from said objective;
   b. a radiation source remote from the objective for directing a beam of radiation toward the edge of the beam splitting device;
   c. first and second radiation sensitive detectors remote from the objective, for receiving the first and second beams and producing electrical signals representing the intensities of said beams, said detectors each including at least two subdetectors separated by a line having a predefined orientation relative to the edge;
   d. circuitry coupled to the detectors for summing said signals and producing position signals representing a linear position and an angular position of the objective relative to the coordinate system; and
   e. means responsive to said position signals for controlling the position of the objective.

* * * * *